United States Patent [19]

Grot et al.

[11] Patent Number: 4,544,458
[45] Date of Patent: Oct. 1, 1985

[54] FLUORINATED ION EXCHANGE POLYMER CONTAINING CARBOXYLIC GROUPS, PROCESS FOR MAKING SAME, AND FILM AND MEMBRANE THEREOF

[75] Inventors: Walther G. Grot, Chadds Ford, Pa.; Charles J. Molnar; Paul R. Resnick, both of Wilmington, Del.

[73] Assignee: E. I. Du Pont de Nemours and Company, Wilmington, Del.

[21] Appl. No.: 159,796

[22] Filed: Jun. 16, 1980

Related U.S. Application Data

[60] Division of Ser. No. 959,839, Nov. 13, 1978, Pat. No. 4,267,364, which is a continuation-in-part of Ser. No. 789,726, Apr. 20, 1977, abandoned, and Ser. No. 789,727, Apr. 20, 1977, abandoned.

[51] Int. Cl.$^4$ .......................... C25B 1/14; C25B 1/18; C25B 1/34; C08F 5/20
[52] U.S. Cl. ........................................ 204/98; 521/38; 204/128; 204/252; 204/296
[58] Field of Search ...................... 204/296, 98; 521/38

[56] References Cited

U.S. PATENT DOCUMENTS

| | | | |
|---|---|---|---|
| 2,765,326 | 10/1956 | Severson | 260/408 |
| 2,951,051 | 8/1960 | Tiers | 260/408 |
| 3,503,945 | 3/1970 | Kim | 526/245 |
| 3,674,758 | 7/1972 | Carlson | 526/247 |
| 3,723,485 | 3/1973 | Thom | 260/408 |
| 3,770,567 | 11/1973 | Grot | 526/243 |
| 3,853,720 | 12/1974 | Korach et al. | 204/295 |
| 3,976,549 | 8/1976 | Falvo | 204/295 |
| 4,116,888 | 9/1978 | Ukibashi et al. | 526/245 |
| 4,151,053 | 4/1979 | Seko et al. | 204/98 |
| 4,178,218 | 12/1979 | Seko | 204/98 |
| 4,200,711 | 4/1980 | Omoue et al. | 525/344 |
| 4,209,367 | 6/1980 | Seko et al. | 204/296 |

FOREIGN PATENT DOCUMENTS

| | | | |
|---|---|---|---|
| 93990 | 11/1972 | Fed. Rep. of Germany | 521/32 |
| 112567 | 3/1975 | Japan | 204/98 |
| 52-24177 | 2/1977 | Japan | 204/98 |

*Primary Examiner*—Joseph L. Schofer
*Assistant Examiner*—Peter F. Kulkosky

[57] ABSTRACT

Fluorinated ion exchange polymers which have pendant side chains which contain —OCF$_2$COOR groups, or which have both pendant side chains containing carboxylic groups and pendant side chains which contain sulfonyl groups, when used in the form of membranes to separate the anode and cathode compartments of an electrolysis cell, permit operation at high current efficiency. Those containing both carboxylic and sulfonyl groups can be made by oxidation of fluorinated polymers which have pendant side chains containing sulfinic groups, or both sulfinic and sulfonyl groups. The fluorinated polymers which have pendant side chains containing sulfinic groups, or both sulfinic and sulfonyl groups, are in turn made from fluorinated polymers which have pendant side chains containing sulfonyl halide groups by reduction with, for example, hydrazine. Those polymers which have only pendant side chains which contain —OCF$_2$COOR groups can be made by copolymerization of a mixture of monomers, one of which is a vinyl monomer which contains the indicated carboxylic group. Fluorinated ion exchange polymers which have pendant side chains containing —OCF$_2$COOR groups and also pendant side chains which contain sulfonyl groups can also be made by copolymerization of a mixture of monomers, one of which is a vinyl monomer which contains the indicated carboxylic group; and also by treatment of a polymer which contains —OCF$_2$CF$_2$SO$_3$H or salts thereof with a combination of fluorine and oxygen.

34 Claims, No Drawings

FLUORINATED ION EXCHANGE POLYMER CONTAINING CARBOXYLIC GROUPS, PROCESS FOR MAKING SAME, AND FILM AND MEMBRANE THEREOF

CROSS-REFERENCE TO RELATED APPLICATIONS

This application is a division of application Ser. No. 959,839 filed Nov. 13, 1978, now U.S. Pat. No. 4,267,364 which is a continuation-in-part of applicants' prior copending U.S. applications, Ser. No. 789,726 filed Apr. 20, 1977, and Ser. No. 789,727 filed Apr. 20, 1977, both now abandoned.

BACKGROUND OF THE INVENTION

This invention concerns improvements in and relating to fluorinated ion exchange polymers, and particularly to such polymers used in the form of films and membranes used in chloralkali electrolysis cells.

Fluorinated ion exchange polymer in such membranes can be derived from a fluorinated precursor polymer which contains pendant side chains in sulfonyl fluoride form. The sulfonyl fluoride functional groups have been converted to ionic form in various ways, for example, to sulfonate salts by hydrolysis with an alkaline material, to the sulfonic acid by acidification of the salts, and to the sulfonamide by treatment with ammonia. Examples of such teachings in the art can be found in U.S. Pat. No. 3,282,875, U.S. Pat. No. 3,784,399, and U.S. Pat. No. 3,849,243.

Although such polymers and membranes have many desirable properties which make them attractive for use in the harsh chemical environment of a chloralkali cell, such as good long-term chemical stability, their current efficiencies are not as high as is desired, especially when the caustic is produced at high concentration. As transport of hydroxyl ion in an chloralkali cell from the catholyte through the membrane to the anolyte increases, current efficiency drops. Larger amounts of oxygen impurity in the chlorine are thereby produced, and there is a greater buildup of chlorate and hypochlorite contaminants in the brine, which contaminants must be removed and discarded to maintain acceptable cell operation. Current efficiencies of at least 90% are highly desirable.

Accordingly, there is a need for polymers and membranes which will permit cell operation at high current efficiencies, and especially for those which will permit operation at high efficiencies over long periods of time. Additionally, it was desired to find a method for modifying the known polymers and membranes which have pendant side chains in sulfonyl fluoride form in such a way to obtain polymers and membranes which will have the high current efficiencies desired.

SUMMARY OF THE INVENTION

It has now been found that fluorinated ion exchange polymers and membranes which contain pendant side chains in ionic carboxylic form, or which contain pendant side chains in ionic carboxylic form and pendant side chains in ionic sulfonyl form, have high current efficiencies.

According to the present invention, there is provided a process which comprises contacting a first fluorinated polymer which contains pendant side chains containing

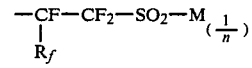

groups, wherein $R_f$ is F, Cl or a $C_1$ to $C_{10}$ perfluoroalkyl radical, M is H, an alkali metal, an alkaline earth metal, ammonium, substituted ammonium including quaternary ammonium, or hydrazinium including substituted hydrazinium, and n is the valence of M, with an oxidizing agent, and separating therefrom a second fluorinated polymer which contains pendant side chains containing

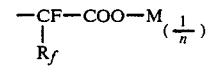

groups.

There is also provided according to the present invention a fluorinated polymer which contains pendant side chains containing

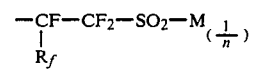

groups, wherein $R_f$ is F, Cl or a $C_1$ to $C_{10}$ perfluoroalkyl radical, M is H, an alkali metal or an alkaline earth metal, ammonium, substituted ammonium including quaternary ammonium, or hydrazinium including substituted hydrazinium, and n is the valence of M. More specifically, the polymer which contains pendant side chains which contain sulfinic groups is

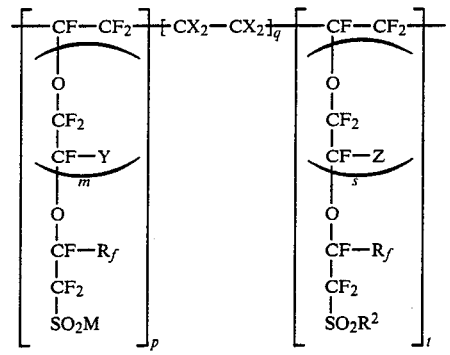

wherein
m is 0, 1 or 2,
p is 1 to 10,
q is 3 to 15,
s is 0, 1 or 2,
t is 0 to 10,
the X's taken together are four fluorines or three fluorines and one chlorine,
Y is F or $CF_3$,
Z is F or $CF_3$,
$R_f$ F, Cl or a $C_1$ to $C_{10}$ perfluoroalkyl radical,
$R^2$ is F, Cl or

M is H, alkali metal, alkaline earth metal, ammonium, substituted ammonium including quaternary ammonium, hydrazinium including substituted hydrazinium, and n is the valence of M. When reduction of sulfonic to sulfinic groups is essentially complete, t in this polymer will be 0. More often, both p and t will be at least 1.

There is also provided a fluorinated polymer which contains pendant side chains, about 10 to about 95% of which side chains contain

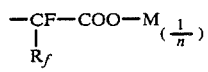

groups and about 5 to about 90% of which side chains contain

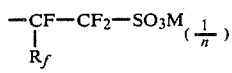

groups, wherein $R_f$ is F, Cl or a $C_1$ to $C_{10}$ perfluroalkyl radical, M is H, an alkali metal, an alkaline earth metal, ammonium, substituted ammonium including quaternary ammonium, or hydrazinium including substituted hydrazinium, and n is the valence of M.

More specifically, such a polymer has the repeating units

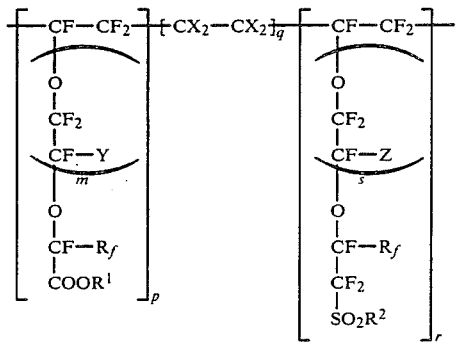

wherein
m is 0, 1 or 2,
p is 1 to 10,
q is 3 to 15,
r is 1 to 10,
s is 0, 1, 2 or 3,
the X's taken together are four fluorines or three fluorines and one chlorine,
Y is F or $CF_3$,
Z is F or $CF_3$,
$R_f$ is F, Cl or a $C_1$ to $C_{10}$ perfluoroalkyl radical,
$R^1$ is lower alkyl or

$R^2$ is F, Cl or

M is H, alkali metal, alkaline earth metal, ammonium, substituted ammonium including quaternary ammonium, hydrazinium including substituted hydrazinium, and n is the valence of M.

With reference to part of the definition of M, "ammonium, substituted ammonium including quaternary ammonium, or hydrazinium including substituted hydrazinium" includes groups defined more specifically as

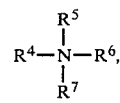

wherein
$R^4$ is H, lower alkyl such as $C_1$ to $C_6$, or $NH_2$; and $R^5$, $R^6$ and $R^7$ are each independently H or lower alkyl such as $C_1$ to $C_6$, with the understanding that any two of $R^4$,
$R^5$, $R^6$ and $R^7$ may join to form a hetero ring, such as a piperidine or morpholine ring.

There is also provided according to the present invention a polymer having the repeating units

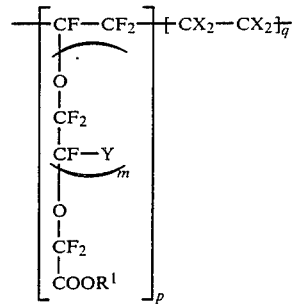

wherein
m is 0, 1 or 2,
p is 1 to 10,
q is 3 to 15,
the X's taken together are four fluorines or three fluorines and one chlorine,
Y is F or $CF_3$,
$R^1$ and H, lower alkyl or

M is alkali metal, alkaline earth metal, ammonium or quaternary ammonium, and
t is the valence of M.

Further within the purview of the present invention is the process for converting chemical compounds containing a

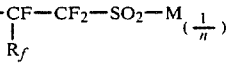

group to chemical compounds containing a

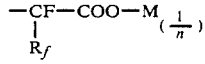

group, wherein $R_f$, M and n are as defined above, by reaction with an oxidizing agent. There are also provided according to the invention certain novel chemical compounds made with this process, including novel vinyl monomers which contain carboxylic functional groups and which are useful in making the above polymers; also, films and membranes of the polymers; and laminar structures containing the polymers.

There is further provided according to the invention a process for making a fluorinated polymer which has pendant side chains which contain

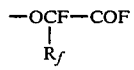

groups by contacting a fluorinated polymer which has pendant side chains which contain

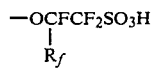

groups or salts thereof with a mixture of fluorine and oxygen. Hydrolysis of the polymer thus obtained produces a fluorinated ion exchange polymer which contains

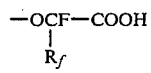

groups or salts thereof, or both

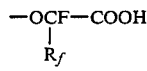

and

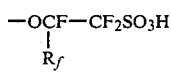

groups or salts thereof.

The ion exchange membranes of the present invention which contain ionizable carboxylic groups, or both ionizable carboxylic and ionizable sulfonyl groups, as active ion exchange sites are highly desirable in comparison with prior art ion exchange membranes for several distinct reasons. Most importantly, outstanding efficiencies in a chlor-alkali cell have been obtained in comparison with membranes which contain only sulfonic acid ion exchange groups obtained by hydrolysis of pendant sulfonyl groups. For example, treatment of a membrane having pendant sulfonyl groups to modify a surface layer to incorporate carboxylic groups according to the present invention results in a dramatic increase in current efficiency in a chlor-alkali cell. This improvement is considered to be of predominant importance in commercial applicability in reducing the cost of producing a unit of chlorine and caustic. Illustratively, in a chlor-alkali plant producing, for example, 1000 tons per day of chlorine, the direct savings in electrical power for only a 1% increase in efficiency are very significant.

DESCRIPTION OF THE PREFERRED EMBODIMENTS

A need has developed in the chlor-alkali industry for improved ion exchange materials which can be used to replace existing cell compartment separators which have been used for decades without substantial improvement in design.

For use in the environment of a chlor-alkali cell, the membrane must be fabricated from a material which is capable of withstanding exposure to a hostile environment, such as chlorine and solutions which are highly alkaline. Generally, hydrocarbon ion exchange membranes are totally unsatisfactory for this kind of use because such membranes cannot withstand this environment.

For commercial use in the chlor-alkali industry, a film must go beyond the ability to be operable for prolonged time periods in the production of chlorine and caustic. A most important criterion is the current efficiency for conversion of brine in the electrolytic cell to the desired products. Improvement in current efficiency can translate into pronounced savings in the cost of production of each unit of chlorine and caustic. Additionally, from a commercial standpoint the cost of production of each unit of products will be determinative of the commercial suitability of an ion exchange membrane.

The ion exchange polymers of the present invention possess pendant side chains which contain carboxylic groups and pendant side chains which contain sulfonyl groups attached to carbon atoms having at least one fluorine atom connected thereto. The ion exchange polymers of the invention can be made from polymers which contain pendant side chains containing

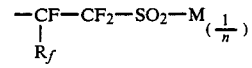

groups wherein $R_f$ is F, Cl or a $C_1$ to $C_{10}$ perfluoroalkyl radical, M is as defined above, and n is the valence of M, by subjecting them to an oxidation. A variety of oxidizing agents are found effective for oxidizing pendant side chains containing

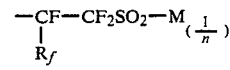

groups to side chains containing

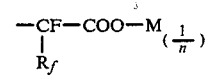

groups.

Among suitable oxidizing agents are oxygen, chromic acid, permanganate salts, vanadate salts in acid solution, nitrous acid, and hypochlorite salts. The term "oxygen" is intended to encompass mixtures of gases which contain oxygen, such as air. The preferred oxidizing agents are oxygen, chromic acid, permanganate salts and vanadate salts because they are more effective.

Oxygen can be used to oxidize the pendant groups defined above when M is H, that is, when the functional group is the free sulfinic acid. With this oxidizing agent, it is preferred to carry out the oxidation in the presence of a metal catalyst. It is also preferred to employ an elevated temperature. At or near room temperature without a catalyst, although oxygen has little or no observable effect even over a period of a few days, significant conversion to carboxyl groups is observed after three to four weeks. At higher temperatures the oxidation is faster; for example, at 50–60° C., without a catalyst, there is a significant amount of oxidation to carboxyl groups by air after only a few days. When oxygen is the oxidant, the polymer, film or membrane to be so treated can simply be exposed to the gas, or it can be contacted with oxygen in a liquid medium such as water. The use of a catalyst is preferred as it speeds the reaction. Metals which can exist in more than one valence state can be used as catalyst. (For present purposes, zero is not counted as a valence state.) For example, salts of iron, vanadium, uranium, cobalt, nickel, copper and manganese have been found effective.

Other effective oxidizing agents for the pendant groups, when the functional group is either in the free sulfinic acid form or in the form of an alkali metal or alkaline earth metal salt thereof, include permanganate in either acidic or basic media, chromic acid, vanadate salts in acidic media, nitrous acid, and hypochlorite salts in basic media. It should be understood that the polymer can be in either free acid form, or salt thereof, when introduced to such oxidizing agents, and that the acid or salt forms may interconvert depending on the pH of the oxidizing medium used. The oxidations are ordinarily carried out at temperatures above room temperature. These oxidations can be carried out in media such as water, or in the presence of inorganic or organic acids such as sulfuric acid, hydrochloric acid, acetic acid, etc.

It has also been observed that pendant

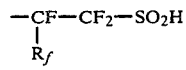

groups can be converted to

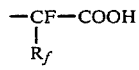

groups by placing them in boiling water or a boiling organic or inorganic acid such as formic acid for a period of at least several hours. It is believed that air oxidation may be occurring under such conditions. Some oxidizing agents, such as hydrogen peroxide and nitric acid are ineffective for present purposes. It is a simple matter to distinguish oxidizing agents effective for present purposes from those that are ineffective merely by determining the presence or absence of characteristic absorption bands in the infrared spectrum of the product corresponding to carboxylic acid groups at about 1785 cm$^{-1}$ or to salts thereof at about 1680 cm$^{-1}$.

It has also been found that a fluorinated compound containing a

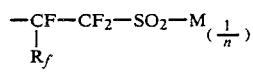

group, wherein $R_f$, M and n are as defined above can be oxidized to a

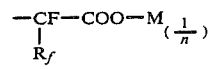

group using oxidizing agents and reaction conditions as described above. The process is generally applicable for compounds

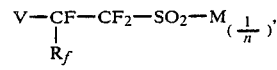

where V is a straight-chain or branched $C_1$ to $C_{20}$ perhalogenated radical, optionally containing one or more ether linkages and the halogen atoms are fluorine and/or chlorine. To cite but a few examples, V can be $C_xF_{2x+1}$, where x is 1 to 20;
$CF_2Cl-CFCl-C_yF_{2y}-$, where y is 1 to 18;
and

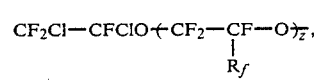

where z is 1 to 3,
and $R_f$ is as defined above.

The resulting caboxylic compounds are in some cases known compounds useful, for example, for conversion to vinyl esters from which polymers can be made and fabricated into films, etc. The sulfinic acid having a terminal $CF_2Cl-CFCl-$ group can be derived, for example, starting from a known sulfonyl compound which has a terminal vinyl group, by first adding chlorine to saturate the terminal vinyl group, then reducing the sulfonyl to the sulfinic group with bisulfite or a hydrazine. The intermediate sulfinic acid compound is then oxidized to the carboxylic compound which still has the terminal $CF_2Cl-CFCl-$ group, and this in turn can then be dechlorinated, as with zinc, to make an olefinic carboxylic acid which is useful for making polymers and copolymers. The polymers and copolymers can be used, for example, in making films and in ion exchange applications.

The ion exchange polymers of the present invention possess pendant side chains which contain carboxylic groups attached to carbon atoms having at least one fluorine atom connected thereto, or pendant side chains which contain carboxylic groups attached to carbon atoms having at least one fluorine atom connected thereto and pendant side chains which contain sulfonyl groups attached to carbon atoms having at least one fluorine atom connected thereto, as set forth above.

The ion exchange polymers of the present invention which possess pendant side chains which contain carboxylic groups, or which possess pendant side chains which contain carboxylic groups and pendant side chains which contain sulfonyl groups, possess general utility as ion exchange resins. When used in a film or membrane to separate the anode and cathode compartments of an electrolysis cell, such as a chloralkali cell, the polymer should have a total ion exchange capacity of 0.5 to 1.6 meg/g (milliequivalents/gram), preferably from 0.8 to 1.2 meg/g. Below an ion exchange capacity of 0.5 meg/g, the electrical resistivity becomes too high, and above 1.6 meg/g the mechanical properties are poor because of excessive swelling of the polymer. The values of p, q and r in the above formulas of the copolymers should be adjusted or chosen such that the polymer has an equivalent weight no greater than about 2000, preferably no greater than about 1500, for use as an ion exchange barrier in an electrolytic cell. The equivalent weight above which the resistance of a film or membrane becomes too high for practical use in an electrolytic cell varies somewhat with the thickness of the film or membrane. For thinner films and membranes, equivalent weights up to about 2000 can be tolerated. For most purposes, however, and for films of ordinary thickness, a value no greater than about 1500 is preferred.

The polymers which contain pendant side chains containing

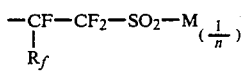

groups, wherein $R_f$, M and n are as defined hereinabove, are in turn made from known precursor fluorinated polymers which contain pendant side chains containing

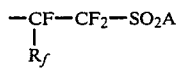

groups wherein $R_f$ is as defined above, and A is F or Cl, preferably F. Ordinarily, the functional group in the side chains of the precursor polymer will be present in terminal

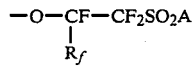

groups. When this is the case, the intermediate polymer will contain

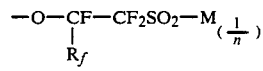

(sulfinic) groups, and the polymers prepared therefrom will contain both

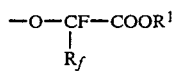

and

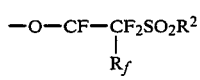

groups. The precursor fluorinated polymers employed can be of the type disclosed in U.S. Pat. No. 3,282,875, U.S. Pat. No. 3,560,568 and U.S. Pat. No. 3,718,627. More specifically, the precursor polymers can be prepared from monomers which are fluorinated or fluorine substituted vinyl compounds. The precursor polymers are made from at least two monomers, with at least one of the monomers coming from each of the two groups described below.

The first group is fluorinated vinyl compounds such as vinyl fluoride, hexafluoropropylene, vinylidene fluoride, trifluoroethylene, chlorotrifluoroethylene, perfluoro(alkyl vinyl ether), tetrafluoroethylene and mixtures thereof. In the case of copolymers which will be used in electrolysis of brine, the precursor vinyl monomer desirably will not contain hydrogen.

The second group is the sulfonyl-containing monomers containing the precursor group

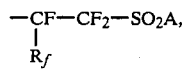

wherein R and A are as defined above. Additional examples can be represented by the general formula $CF_2=CF-T_k-CF_2SO_2F$ wherein T is a bifunctional perfluorinated radical comprising 1 to 8 carbon atoms, and k is 0 or 1. The particular chemical content or structure of the radical T is not critical, but it must have a fluorine atom attached to the carbon atom to which the $-CF_2SO_2F$ group is attached. Other atoms connected to this carbon can include fluorine, chlorine, or hydrogen although generally hydrogen will be excluded in use of the copolymer for ion exchange in a chloralkali cell. The T radical of the formula above can be either branched or unbranched, i.e., straight-chain, and can have one or more ether linkages. It is preferred that the vinyl radical in this group of sulfonyl fluoride containing comonomers be joined to the T group through an ether linkage, i.e., that the comonomer be of the formula $CF_2=CF-O-T-CF_2-SO_2F$. Illustrative of such sulfonyl fluoride containing comonomers are $CF_2=CFOCF_2CF_2SO_2F$,

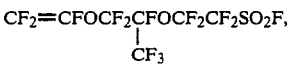

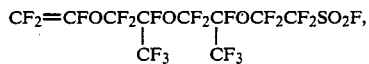

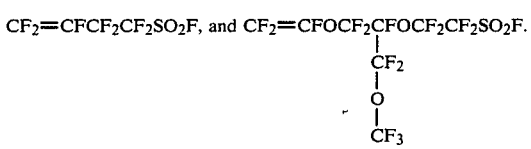

The most preferred sulfonyl fluoride containing comonomer is perfluoro(3,6-dioxa-4-methyl-7-octenesulfonyl fluoride),

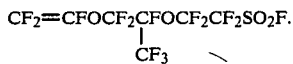

The sulfonyl-containing monomers are disclosed in such references as U.S. Pat. No. 3,282,875, U.S. Pat. No. 3,041,317, U.S. Pat. No. 3,718,627 and U.S. Pat. No. 3,560,568.

The preferred copolymers utilized as the precursor are perfluorocarbon although others can be utilized as long as the T group has a fluorine atom attached to the carbon atom which is attached to the $-CF_2SO_2F$ group. The most preferred copolymer is a copolymer of tetrafluoroethylene and perfluoro(3,6-dioxa-4-methyl-7-octenesulfonyl fluoride) which comprises 20 to 65 percent, preferably, 25 to 50 percent by weight of the latter.

The precursor copolymer used in the present invention and copolymers of the invention can be prepared by general polymerization techniques developed for homo- and copolymerizations of fluorinated ethylenes, particularly those employed for tetrafluoroethylene which are described in the literature. Nonaqueous techniques for preparing the copolymers of the present invention include that of U.S. Pat. No. 3,041,317, that is, by the polymerization of a mixture of the desired component monomers in the presence of a free radical initiator, preferably a perfluorocarbon peroxide or azo compound, at a temperature in the range of 0°–200° C. and at pressures in the range 1–200 or more atmospheres. The nonaqueous polymerization may, if desired, be carried out in the presence of a fluorinated solvent. Suitable fluorinated solvents are inert, liquid, perfluorinated hydrocarbons, such as perfluorooctane, perfluorobenzene and the like, and inert, liquid chlorofluorocarbons such as 1,1,2-trichloro-1,2,2-trifluoroethane, and the like.

Aqueous techniques for preparing the copolymers of this invention include contacting the monomers with an aqueous medium containing a free-radical initiator to obtain a slurry of polymer particles in non-water-wet or granular form, as disclosed in U.S. Pat. No. 2,393,967, or contacting the monomers with an aqueous medium containing both a free-radical initiator and a telogenically inactive dispersing agent, to obtain an aqueous colloidal dispersion of polymer particles, and coagulating the dispersion, as disclosed, for example, in U.S. Pat. No. 2,559,752 and U.S. Pat. No. 2,593,583.

The novel intermediate polymers which contain pendant side chains containing

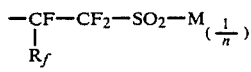

groups are made from the known precursor fluorinated polymers which contain pendant side chains containing

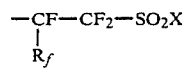

groups by reduction with a compound having the formula

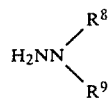

wherein $R^8$ is H or $C_1$ to $C_8$ alkyl radical, and $R^9$ is H or a $C_1$ to $C_8$ alkyl radical, preferably H. The preferred reducing agent is hydrazine in view of its ready availability. Another effective compound is methylhydrazine. Accordingly, the preferred reducing agents are those which have the formula $H_2NNHR^8$.

A variety of reaction conditions can be used for the reduction. For example hydrazine has been found effective when used anhydrous, as the known hydrazine hydrate, as a 50% by weight solution in water, or in solution in other solvents such as dimethylsulfoxide. The reduction with a hydrazine can advantageously be carried out in the presence of an acid acceptor. The acid acceptor can be a tertiary amine such N-methyl-morpholine, N,N,N',N'-tetramethylethylenediamine; pyridine or triethylamine, or a metal hydroxide such as KOH or NaOH. Use of a hydroxide or tertiary amine is preferred because the sulfinic acid product and by-product hydrogen fluoride can form salts with the hydrazine reagent, and the hydroxide or tertiary amine forms a salt with the sulfinic acid and frees the hydrazine to be available for reducing other sulfonyl halide groups.

Reduction with a hydrazine is ordinarily done at temperatures from about room temperature to about 40° C., although higher temperatures can also be used. The reaction rate increases as the amount of water in the reaction medium is decreased. Also the reaction rate increases in dimethylsulfoxide as a medium, and in the presence of a hydroxide or tertiary amine.

The sulfinic groups in the reduced polymer will be in the form of sulfinic acid groups, or an alkali metal or alkaline earth metal salt thereof. Similarly, any sulfonyl halide groups that have been hydrolyzed will be in the form of sulfonic acid groups, or an alkali or alkaline earth metal salt thereof. In both cases, the form will depend on the nature of the last medium with which the polymer was treated, and will ordinarily be the salt of the strongest base in the medium (or the last medium) to which it is (or was) exposed. Interconversion between acid and salt forms can be accomplished by treatment with solutions of acids or bases, as desired. Treatment times must, of course, be increased as the thickness of the layer to be treated is increased. Following reduction by a hydrazine, it is best to wash the polymer to free it of excess hydrazine before proceeding to the oxidation step. At the same time, an acid or alkaline wash can be carried out, if desired, to put the polymer in free acid or salt form if a specific form is desired for the particular oxidizing agent to be used.

Although the precursor fluorinated polymer can be in the form of powder or granules when subjected to the reduction and oxidation reactions described hereinabove, more often it will be in the form of a film or membrane when subjected to these reactions.

The polymers of the invention which possess pendant side chains which contain carboxylic groups and pendant side chains which contain sulfonyl groups can also be made by copolymerizing a mixture of the appropriate monomers. The carboxyl-containing monomer is one or more compounds from a third group represented by the formula

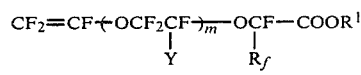

wherein
$R_f$ is F, Cl, or a $C_1$ to $C_{10}$ perfluoroalkyl radical,
$R^1$ is lower alkyl or

M is H, alkali metal, alkaline earth metal, ammonium or quaternary ammonium,
n is the valence of M,
Y is F or $CF_3$, and
m is 0, 1 or 2.

The most preferred monomers are those wherein $R^1$ is lower alkyl, generally $C_1$ to $C_5$, or M where M is H, because of ease of polymerization. Those monomers wherein m is 1 are also preferred because their preparation and isolation in good yield is more easily accomplished than when n is 0 or 2. The novel compounds $$CF_2=CFOCF_2CFOCF_2COOCH_3$$
$$|$$
$$CF_3$$

and the corresponding free carboxylic acid are especially useful monomers.

Monomers of this third group can be prepared, for example, from compounds having the formula $$CF_2=CF(OCF_2CF)_m-OCFCF_2SO_2F$$
$$| \quad |$$
$$Y \quad R_f$$

wherein $R_f$, m and Y are as defined above, by (1) saturating the terminal vinyl group with chlorine to protect it in subsequent steps by converting it to a $CF_2Cl-CFCl-$ group; (2) oxidation with nitrogen dioxide to convert the $$-OCFCF_2SO_2F$$
$$|$$
$$R_f$$

group to an $$-OCFCOF$$
$$|$$
$$R_f$$

group; (3) esterification with an alcohol such as methanol to form an $$-OCFCOOCH_3$$
$$|$$
$$R_f$$

group; and (4) dechlorination with zinc dust to regenerate the terminal $CF_2=CF-$group. It is also possible to replace steps (2) and (3) of this sequence by the steps (a) reduction of the $$-OCFCF_2SO_2F$$
$$|$$
$$R_f$$

group to a sulfinic acid $$-OCFCF_2SO_2H$$
$$|$$
$$R_f$$

or alkali metal or alkaline earth metal salt thereof by treatment with a sulfite salt or hydrazine; (b) oxidation of the sulfinic acid or salt thereof with oxygen or chromic acid, whereby $$-OCFCOOH$$
$$|$$
$$R_f$$

groups or metal salts thereof are formed as is more fully described hereinabove, and (c) esterification to $$-OCFCOOCH_3$$
$$|$$
$$R_f$$

by known methods.

The carboxyl-containing monomer of the third group is copolymerized with fluorinated vinyl compounds from each of the first and second groups of comonomers defined hereinabove, and under non-aqueous polymerization techniques also defined hereinabove.

Other polymers of the invention can be made by copolymerizing a mixture of the appropriate monomers. The carboxyl-containing monomer is one or more compounds from a group represented by the formula $$CF_2=CF(OCF_2CF)_m-OCF_2-COOR^1$$
$$|$$
$$Y$$

wherein
$R^1$ is H, lower alkyl or $$M_{(\frac{1}{t})},$$

M is alkali metal, alkaline earth metal, ammonium or quaternary ammonium,
t is the valence of M,
Y is F or $CF_3$, and
m is 0, 1 or 2.

The most preferred monomers are those wherein $R^1$ is H or lower alkyl, generally $C_1$ to $C_5$, because of ease of polymerization. Those monomers wherein m is 1 are also preferred because their preparation and isolation in good yield is more easily accomplished than when n is 0 or 2. The novel compounds $$CF_2=CFOCF_2CFOCF_2COOCH_3$$
$$|$$
$$CF_3$$

and the corresponding free carboxylic acid are especially useful monomers.

Monomers of this group can be prepared, for example, from compounds having the formula $$CF_2=CF(OCF_2CF)_m-OCF_2CF_2SO_2F$$
$$|$$
$$Y$$

wherein m and Y are as defined above, by (1) saturating the terminal vinyl group with chlorine to protect it in subsequent steps by converting it to a $CF_2Cl-CFCl-$ group; (2) oxidation with nitrogen dioxide to convert the $-OCF_2CF_2SO_2F$ group to an $-OCF_2COF$ group; (3) esterification with an alcohol such as methanol to form an $-OCF_2COOCH_3$ group; and (4) dechlorination with zinc dust to regenerate the terminal $CF_2=CF-$ group. It is also possible to replace steps (2) and (3) of this sequence by the steps (a) reduction of the $-OCF_2CF_2SO_2F$ group to a sulfinic acid, $-OCF_2CF_2SO_2H$, or alkali metal or alkaline earth metal salt thereof by treatment with a sulfite salt or hydrazine; (b) oxidation of the sulfinic acid or salt thereof with oxygen or chromic acid, whereby $-OCF_2COOH$ groups or metal salts thereof are formed; and (c) esterification to $-OCF_2COOCH_3$ by known methods; this sequence is more fully described in U.S. Ser. No. 789,726 in the names of W. G. Grot, C. J. Molnar and P. R. Resnick.

The carboxyl-containing monomer is copolymerized with one or more fluorinated vinyl compounds from a group such as vinyl fluoride, hexafluoropropylene, vinylidene fluoride, trifluoroethylene, chlorotrifluoroethylene, perfluoro(alkyl vinyl ether), tetrafluoroethylene and mixtures thereof. In the case of copolymers which will be used in electrolysis of brine, the precursor vinyl monomer desirably will not contain hydrogen.

Yet another method for preparing copolymers of the invention which possess pendant side chains which contain carboxylic groups and pendant side chains which contain sulfonyl groups is by treating a fluorinated polymer which has pendant size chains which contain

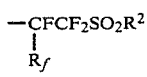

groups wherein $R^2$ is

M is H or alkali metal or alkaline earth metal, and n is the valence of M, with a mixture of fluorine and oxygen, whereby

groups are formed. The

groups can then hydrolyzed to ion exchange groups

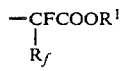

wherein $R^1$ is

Hydrolysis of

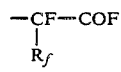

groups to

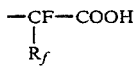

groups occurs so readily that the product isolated from the fluorine/oxygen reaction will ordinarily be at least partially hydrolyzed to the free carboxylic acid. Conversion of

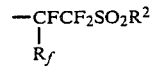

groups to

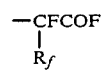

and

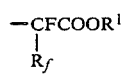

groups can vary from low percentages such as 10% to percentages of more than 50%, at least in regard to the surface layer of the article so treated, depending on the amount of treating reagents used, duration of treatment, etc.

In this method, the molar ratio of fluorine to oxygen can vary widely, e.g., from 1:5 to 1:1000, preferably 1:50 to 1:200. Diluent gases such as nitrogen, helium or argon can be used. Total gas pressure in the system can also vary widely e.g., from 0.1 to 1000 atmospheres. Ordinarily the pressure will be about 75 atmospheres. Temperatures from $-100°$ C. to $250°$ C. can be used, preferably from $20°$ to $70°$ C. Treatment can conveniently be carried out in a corrosion resistant metal pressure vessel.

A specific example of the type of polymer which can be treated with a fluorine/oxygen mixture is one having the repeating units

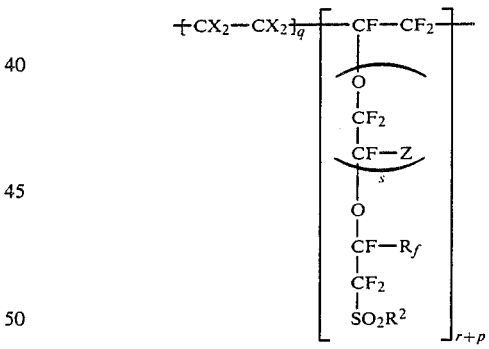

wherein $R_f$, p, q, r, s, X, and Z are as defined hereinabove, and $R^2$ is

where M and n are as defined hereinabove. Following treatment with fluorine/oxygen and hydrolysis, the resulting ion exchange polymer will have r of the sulfonyl-containing groups remaining, and p of them converted to $-OCF_2COF$ and/or $-OCF_2COOH$ groups. It should be understood that while treatment with a mixture of fluorine and oxygen will effectively destroy and remove all of the sulfonate groups on at least the surface of the initial polymer, not all of the pendant side chains from which the sulfonate groups are removed will be converted to pendant side chains which contain carboxylic groups; it is believed that some are converted to pendant side chains which terminate in a —CF$_3$ group. It should be further understood, however, that by proper choice of the initial polymer, copolymer of the invention containing both carboxylic and sulfonyl groups meeting the composition defined hereinabove can be prepared.

The initial polymer which contains r+p sulfonyl-containing side chains is in turn made by copolymerizing fluorinated vinyl monomers of the first and second groups of monomers described above. Such fluorinated polymers are described in U.S. Pat. No. 3,282,875, U.S. Pat. No. 3,560,568, and U.S. Pat. No. 3,718,627.

Although the sulfonyl-containing fluorinated polymer to be treated with a mixture of fluorine and oxygen can be in the form of powder or granules when subjected to such treatment, more often it will be in the form of a film or membrane when it is so treated.

A convenient method for controlling the extent of the reaction brought about by treatment with fluorine and oxygen is to begin with a film or membrane of a polymer which has pendant side chains which contain

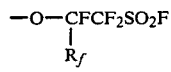

groups, and to bring about a partial hydrolysis to

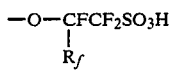

(or metal salts thereof) such that the film or membrane is hydrolyzed on either one or both surfaces thereof to a controlled depth. Upon subsequent treatment with a mixture of fluorine and oxygen, the layer in sulfonyl fluoride form remains unaffected, and the layer in sulfonic acid form reacts such that

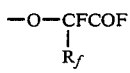

groups are produced as described above. Upon subjecting the film or membrane to a full hydrolytic treatment, the interior layer will have only

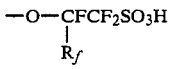

groups (or salts thereof), and the surface layer or layers will have both

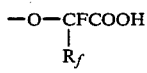

and

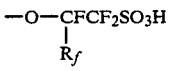

groups (or salts thereof).

The polymers of the present invention can be in the form of films and membranes.

When the polymers of the invention are in the form of a film, desirable thicknesses of the order of 0.05 to 0.5 mm (0.002 to 0.02 inch) are ordinarily used. Excessive film thicknesses will aid in obtaining higher strength, but with the resulting deficiency of increased electrical resistance.

The term "membrane" refers to non-porous structures for separating compartments of an electrolysis cell and which may have layers of different materials, formed, for example, by surface modification of films or by lamination, and to structures having as one layer a support, such as a fabric imbedded therein.

It is possible according to the present invention to make films and membranes wherein the pendant side chains are essentially wholly (i.e., 90% or more) or wholly (i.e., up to about 99%) in the carboxylic form throughout the structure, and also wherein the pendant side chains throughout the structure are in carboxylic and sulfonyl form, for example 10 to 90% of each. Control in this respect is exercised during the reduction of the precursor polymer which contains sulfonyl halide groups to the intermediate polymer which contains sulfinic groups, by using or not using competing reactions which produce different products. For example, when 100% hydrazine is used as the reagent in the reduction reaction, conversion to sulfinic functional groups, and eventually to carboxylic functional groups can be quite high, of the order of 90–95%, and it is believed that in the ultimate surface layers conversion to sulfinic or carboxyl groups can be as high as 98 or 99%. Use of a combination of hydrazine and a hydroxide in a solvent like water or dimethylsulfoxide will result in reduction of some groups to sulfinic form and hydrolysis of others to sulfonic acid salt form; because the sulfonic salt form is not affected during the oxidation step, the ultimate result is a combination of carboxylic and sulfonyl groups in relative amount which varies with the relative amounts of hydrazine, water and hydroxide used. Control of the relative amounts of carboxylic and sulfonyl functional groups can also be exercised to some extent during the oxidation step. Some oxidizing agents such as chromic and vanadate salts will produce relatively larger amounts of carboxylic and small amounts of the original sulfonic groups, while other oxidizing agents such as hypochlorite will produce relatively smaller amount of carboxylic and larger amounts of the original sulfonic groups.

In similar fashion, it is possible to make products where various other functional groups are present in pendant side chains, in combination with carboxylic groups in other pendant side chains. For example, the precursor polymer which contains sulfonyl halide groups can be treated with hydrazine in combination with ammonia or a primary amine, whereby not only will some sulfonyl groups be reduced to sulfinic form, but others will be converted to sulfonamide or N-substituted sulfonamide groups. The technique whereby groups of the precursor polymer can be converted to the form —(SO$_2$NH)$_m$Q, wherein Q is H, NH$_4$, cation of an alkali metal and/or cation of an alkaline earth metal and m is the valence of Q, are set forth in U.S. Pat. No. 3,784,399. Preferred definitions of Q include NH$_4$ and/or cation of an alkali metal particularly sodium or potassium. The technique whereby sulfonyl groups of the precursor polymer can be converted to N-monosubstituted sulfonamide groups and salts thereof are as set forth in Application U.S. Ser. No. 623,920 filed Oct. 20, 1975, now U.S. Pat. No. 4,085,071.

So that the final film or membrane will have as low an electrical resistivity as possible, it is desirable in the cases when sulfonyl groups in a polymer are converted to carboxyl groups that essentially all of the sulfonyl halide groups in the precursor polymer be converted to active cation exchange groups, and in the cases when a polymer is synthesized from monomers that essentially all of the sulfonyl and carboxylic functional groups in the polymer be converted to active cation exchange groups, i.e., to either carboxylic or sulfonyl groups of a type which will ionize or form metal salts. In this respect, it is highly undesirable that a film or membrane to be used for ion exchange purposes in an electrolytic cell have a neutral layer, or that a film or membrane to be used in a chloralkali cell have either a neutral layer or an anion exchange layer. The film and membrane of the present invention do not have neutral or axion exchange layers. In this context, fiber or fabric reinforcing is not considered as a neutral layer, inasmuch as such reinforcing has openings, i.e., its effective area is not coextensive with the area of the film or membrane.

In the case of films and membranes to be used as separators in a chloralkali cell, polymers which contain 40–95% pendant side chains containing carboxylic groups and 5–60% pendant side chains containing sulfonyl groups provide excellent current efficiency. An equally important criterion in a chlor-alkali cell, however, is the amount of power required for each unit of chlorine and caustic. It is considered that the polymers of the type disclosed herein permit a proper combination of operating conditions to realize an excellent and unexpected reduction in power. Since the power requirement (which may be expressed in watt-hours) is a function of both cell voltage and current efficiency, low cell voltages are desirable and necessary. However, a polymer without a high current efficiency cannot operate effectively from a commercial standpoint even with extremely low cell voltages. Additionally, a polymer with an inherent high current efficiency allows a proper combination of parameters as in fabrication into the film and/or operation of the electrolytic cell to realize the potential theoretical reduction in power. Illustratively, the polymer can be fabricated at a lower equivalent weight which may result in some loss of current efficiency which is more than compensated by a reduction in voltage. Polymers of the present invention which have 50–95% pendant side chains containing carboxylic groups and 5–50% pendant side chains containing sulfonyl groups have low power consumption.

It is also possible according to the present invention to make films and membranes which are structured to have one surface wherein the polymer has pendant side chains which are in carboxylic form, and pendant side chains which are in sulfonyl form, and the other surface wherein the pendant side chains of the polymer are wholly in the sulfonyl form. It is further possible to make films and membranes structured to have both surfaces wherein the polymer has pendant side chains in carboxylic form and pendant side chains in sulfonyl form, and an interior layer wherein the pendant side chains of the polymer are wholly in the sulfonyl form. When only one surface of the precursor structure is modified to contain carboxylic groups, the depth of the modified layer will normally be from 0.01% to 80% of the thickness. When both surfaces are modified, the depth of each modified layer will be less than half the thickness of the structure, and will normally be from 0.01 to 40% of thickness. The thickness of a layer modified to contain carboxylic groups will ordinarily be at least 200 angstroms in thickness. A convenient way to treat only one surface of a film or membrane is to fabricate a baglike configuration which is sealed shut, and to treat only the outside or inside of the bag. When only one surface is modified to contain carboxylic groups, that surface can face either the anode or cathode in an electrolysis cell, and in the case of a chloralkali cell it will ordinarily face the cathode.

It is also possible according to the present invention to make films and membranes which are structured to have one surface which consists of the polymers of the present invention which have pendant side chains which contain carboxylic groups, and the other surface which consists of a polymer which has pendant side chains which contain sulfonyl groups. It is further possible to make films and membranes structured to have both surfaces of the carboxylic polymer and an interior layer of the sulfonyl polymer. When only one surface of the structure consists of the carboxylic polymer, the thickness of the carboxylic polymer layer will normally be from 0.01% to 80% of the total thickness. When both surfaces consist of the carboxylic polymer, the thickness of each surface layer will be less than half the thickness of the structure, and will normally be from 0.01 to 40% of the thickness. Laminar structures can be made by melt-pressing together layers of the desired composition. When only one surface consists of the carboxylic polymer, that surface can face either the anode or cathode in an electrolysis cell, and in the case of a chloralkali cell it will ordinarily face the cathode.

Under most circumstances, layered structures will be such that the layer of carboxylic polymer will be about ¼ to 5 mils thick, the base layer of sulfonyl polymer will be about 1 to 15 mils thick, and the total thickness of the structure will be about 2 to 20 mils thick. The indicated thicknesses are effective film thicknesses, i.e., thicknesses which exclude reinforcing fibers and other members which do not contain ion exchange groups.

The base layer of the layered or laminar structures can be a fluorinated ion exchange polymer of known type which has pendant side chains which contain sulfonyl groups. More specifically the pendant side chains may contain $-OCF_2CF_2SO_2R^2$ groups wherein $R^2$ is F, Cl or $OR^3$, where $R^3$ is H or $$M_{(\frac{1}{t})},$$

M is alkali metal, alkaline earth metal, ammonium or quaternary ammonium, and t is the valence of M. Such polymers are disclosed in U.S. Pat. No. 3,282,875, U.S. Pat. No. 3,560,568, and U.S. Pat. No. 3,718,627. It should be understood that the sulfonyl groups must be in ionic form for use in an electrolysis cell, i.e., those polymers where $R^2$ is $OR^3$.

Polymers according to the present invention which contain carboxylic groups or both carboxylic and sulfonyl groups have utility to function for ion exchange. Accordingly, general utility of the polymer for ion exchange is directly contemplated. Illustratively, permeation selection of cations is directly encompassed. One method of determination of cation exchange properties is a measurement of permselectivity with separation of the same cations in solutions but at different concentrations. This involves cation transport, and a permselectivity measurement of no voltage would indicate the polymer does not function for ion exchange.

The polymers which contain sulfinic groups are useful as intermediates to polymers, films and membranes which contain carboxylic groups.

A specific use for the polymers of the present invention which contain carboxylic groups or both carboxylic and sulfonyl groups is in a chloralkali cell, such as disclosed in German patent application No. 2,251,660, published Apr. 26, 1973, and Netherlands patent application No. 72.17598, published June 29, 1973. In a similar fashion as these teachings, a conventional chloralkali cell is employed with the critical distinction of the type of polymeric film used to separate the anode and cathode portions of the cell. While the description of said German and Dutch publications is directed to use in a chloralkali cell, it is within the scope of the present disclosure to produce alkali or alkaline earth metal hydroxides and halogen such as chlorine from a solution of the alkali or alkali earth metal salt. While efficiencies in current and power consumption differ, the operating conditions of the cell are similar to those disclosed for sodium chloride.

An outstanding advantage has been found in terms of current efficiency in a chlor-alkali cell with the fluorinated polymers of the type disclosed herein with pendant groups present as carboxylic groups, or with pendant groups which contain carboxylic groups and pendant groups which contain sulfonyl groups.

To further illustrate the innovative aspects of the present invention, the following examples are provided.

EXAMPLE 1

A 4-mil film of a copolymer of tetrafluoroethylene and perfluoro(3,6-dioxa-4-methyl-7-octenesulfonyl fluoride) having an equivalent weight of 1100 was immersed for 16 hours at room temperature in 85% hydrazine hydrate, washed with water and immersed for 30 minutes at room temperature in a 5% solution of potassium hydroxide. The film was washed with water and immersed at room temperature in a mixture of 25 ml formic acid and 5 ml 37% hydrochloric acid in an atmosphere of oxygen. Increasing conversion to the carboxylic acid form was observed by IR analysis after 5 and 60 hours at room temperature and after an additional 2 hours at 70°–80° C. in this medium.

The degree of conversion to the carboxylic acid form was further increased by heating the film (after a water wash) for 2 hours at 50° C. in a mixture of 75% acetic acid, 3% concentrated sulfuric acid, 2% chromium trioxide and 20% water. The film was washed with water, and conditioned for cell testing by heating for 2 hours to 70° C. in a 10% solution of sodium hydroxide. Aqueous sodium chloride was electrolyzed at a current density of 2.0 asi (amps/in$^2$) to give 35% NaOH at a current efficiency of 91% at a cell voltage of 4.9 volts.

EXAMPLE 2

A 4-mil film of a copolymer of tetrafluoroethylene and perfluoro(3,6-dioxa-4-methyl-7-octenesulfonyl fluoride) having an equivalent weight of 1100 was immersed for 48 hours at room temperature in 85% hydrazine hydrate. IR analysis at this point indicates essentially complete conversion to the sulfinic salt form through the entire thickness of the film. The film was then heated for 20 minutes to 90° C. in a solution of potassium hydroxide (13%) in aqueous dimethyl sulfoxide (30%), rinsed with water and immersed for 20 minutes at room temperature in a mixture of 20 ml aqueous hydrochloric acid and 100 ml glacial acetic acid. The film was again rinsed with water and then heated for 16 hours to 130° C. in an atmosphere of oxygen. IR analysis at this point indicated the formation of $-CF_2CO_2H$ functional groups, the presence of $-CF_2SO_3H$ groups, and the complete absence of $-SO_2F$ of the starting material as well as $-SO_2R$ groups of the sulfinate intermediate.

The film was conditioned for cell testing by heating for 2 hours in a 10% solution of sodium hydroxide. Aqueous sodium chloride was electrolyzed at a current density of 2.0 asi to give 32% NaOH at a current efficiency of 91% at a cell voltage of 4.7 volts.

EXAMPLE 3

A 4-mil film of a copolymer of tetrafluoroethylene and perfluoro(3,6-dioxa-4-methyl-7-octenesulfonyl fluoride) having an equivalent weight of 1100 was immersed for 20 hours at room temperature in a mixture of 300 ml dimethylsulfoxide, 100 ml N-methylmorpholine and 80 ml 85% hydrazine hydrate. The film was then washed with dilute potassium hydroxide solution and water and immersed for 10 minutes at room temperature in a mixture of 200 ml acetic acid, 10 ml concentrated sulfuric acid, 2 gm ammonium vanadate, 1 gm vanadyl sulfate and 300 ml water. After that the film was washed with water and exposed to air at room temperature for 6 days.

The film was then converted to the potassium salt form by heating for 30 minutes to 90° C. in a solution containing 13% potassium hydroxide and 30% dimethylsulfoxide and washing with water.

Analysis by X-ray fluorescence at this point showed a potassium content of 0.965 gram atoms per kg and 0.075 gm atoms of sulfur per kg. This indicates a content of 0.89 meg/gm of carboxylate groups and 0.075 meg/gm of sulfonate groups.

Aqueous sodium chloride was electrolyzed at a current density of 2.0 asi in a cell with this film as the membrane to produce 35% NaOH as a current efficiency of 92% at a cell voltage of 4.9 volts.

EXAMPLE 4

A 4-mil film of a copolymer of tetrafluoroethylene and perfluoro(3,6-dioxa-4-methyl-7-octenesulfonyl fluoride) having an equivalent weight of 1100 was immersed for 30 hours at room temperature in 85% hydrazine hydrate (54% hydrazine on an anhydrous basis). The film was then washed with water and a dilute solution of potassium hydroxide. Infrared analysis indicated that this treatment caused substantially complete reduction of sulfonyl groups to sulfinic groups through the entire thickness of the film.

The film was then heated for 17 hours to 70° C. in a solution containing 5% chromium trioxide and 50% acetic acid in water, rinsed with water, and conditioned for cell testing by heating for 2 hours to 70° C. in a 10% solution of sodium hydroxide. Aqueous sodium chloride was electrolyzed at a current density of 2.0 asi to produce 33% sodium hydroxide at a current efficiency of 90% and a cell voltage of 4.1 volts.

EXAMPLE 5

A 7-mil film of a copolymer of tetrafluoroethylene and perfluoro(3,6-dioxa-4-methyl-7-octenesulfonyl fluoride) having an equivalent weight of 1100 was placed as a liner in a dish and anhydrous hydrazine (95%) was poured into the liner so as to contact only the upper surface of the film. After 2 minutes at room temperature, the hydrazine was removed and the film was washed with water.

The film was then immersed in 50 ml glacial acetic acid, and 25 ml of a 20% solution of sodium nitrite was added in portions during a period of 1 hour. The film was again washed with water. Staining of a cross-section with Sevron ® Brilliant Red 4G indicated a depth of reaction of 0.5 mils.

The unreacted $SO_2F$ groups were hydrolyzed by heating for 30 minutes to 90° C. in a solution of potassium hydroxide (13%) in aqueous dimethylsulfoxide (30%). The film was installed in a chloralkali cell with the hydrazine treated and oxidized side toward the catholyte. Aqueous sodium chloride was electrolyzed at a current density of 2.0 asi to give 25% NaOH at a current efficiency of 81% at a cell voltage of 4.3 volts.

EXAMPLE 6

A 4-mil film of a copolymer of tetrafluoroethylene and perfluoro(3,6-dioxa-4-methyl-7-octenesulfonyl fluoride) having an equivalent weight of 1100 was immersed for 16 hours at room temperature in 85% hydrazine hydrate. The film was rinsed with water, then with a hot 2% solution of sodium hydroxide, and again with water. The film was then heated for 1 hour to 50°-60° C. in a solution of 1% potassium bisulfate in 80% acetic acid (balance water), wiped off and exposed to room temperature air for 3 days. The oxidation was completed by 2 hours immersion in a solution of 2% $CrO_3$ and 3% $H_2SO_4$ in 75% acetic acid (balance water) at 50° C.

The film was washed with water, then heated to 70° C. for 1 hour in a 10% solution of NaOH, and evaluated in a chloralkali cell. Aqueous sodium chloride was electrolyzed at a current density of 2.0 asi (2.0 amps/in²) to give 30% sodium hydroxide at a current efficiency of 91% at a cell voltage of 4.5 volts. After 130 days of operation sodium hydroxide was being produced at a concentration of about 32.5% at a current efficiency of 89% and a cell voltage of 4.3 volts.

EXAMPLE 7

A 7-mil film of a copolymer of tetrafluoroethylene and perfluoro(3,6-dioxa-4-methyl-7-octenesulfonyl fluoride) having an equivalent weight of 1100, having a T-24 "Teflon" fabric imbedded therein, and having one surface layer of about 1 mil depth which had been hydrolyzed to the corresponding potassium salt of the sulfonic acid, was exposed on the sulfonyl fluoride side to a solution of 18 ml hydrazine hydrate and 45 ml N-methylmorpholine in 35 ml dimethylsulfoxide for 15 minutes at room temperature. The sheet was washed with water, dilute potassium hydroxide and again with water. Cutting the sheet through its thickness and staining with Sevron ® Brilliant Red 4G at this point indicated that reaction with hydrazine had occurred to a depth of 0.6 mils.

The sample was then washed with 5% sulfuric acid and exposed to air for 20 hours at room temperature, followed by chromic acid oxidation like that described in Example 6. The sheet was evaluated in a chloralkali cell at a current density of 2.0 asi, and sodium hydroxide was produced at a concentration of 37% at a current efficiency of 88% and a cell voltage of 4.6 volts after 20 days of operation.

EXAMPLE 8

A 7-mil film of a copolymer of tetrafluoroethylene and perfluoro(3,6-dioxa-4-methyl-7-octenesulfonyl fluoride) having an equivalent weight of 1100 was folded and sealed to a bag, except for a small opening to permit the introduction of reagents. A mixture of 250 ml dimethylsulfoxide, 100 ml N-methylmorpholine and 90 ml hydrazine hydrate was poured into the bag and permitted to react for 7 minutes at room temperature. The bag was then emptied, rinsed with water and exposed for 1 hour on the inside with a solution containing 10% KOH and 10% dimethylsulfoxide, rinsed again with water, and then with dilute acetic acid. The bag was then opened, the film was cut through its thickness, and staining with Sevron ® Brilliant Red 4G indicated a depth of reaction of 0.6 mils. The film was then treated for 30 minutes with a solution of 5 gm $VOSO_4$, 5 gm $NH_4VO_3$ and 5 ml concentrated $H_2SO_4$ in 3 liters of water, washed with water and hung up for drying.

After 3 days of air exposure at room temperature, the film was treated for 1 hour with a solution containing 5% acetic acid, 2% $K_2SO_4$ and 2% $KHSO_4$ in water.

The film was then washed with water and vacuum laminated to a T-25 "Teflon" fabric, followed by total hydrolysis for 20 minutes in a solution of KOH in aqueous dimethylsulfoxide.

The resulting membrane was evaluated in a chloralkali cell with the hydrazine treated and oxidized surface facing the catholyte. Sodium hydroxide was produced at a concentration of 31% by weight at a current efficiency of 87% and a cell voltage of 5.8 volts at a current density of 2 asi.

EXAMPLE 9

Preparation of
$CF_2=CFOCF_2CF(CF_3)OCF_2COOCH_3$

Methyl perfluoro-4-methyl-3,6-dioxa-7-octenoate

A 2-liter 3-necked flask was fitted with a stirrer, gas inlet tube and dry ice cooled condenser. The apparatus was blanketed with nitrogen, 3276.1 g of perfluoro[2-(2-fluorosulfonylethoxy)-propyl vinyl ether] added and chlorine bubbled into the flask while irradiating with a sunlamp until no more chlorine was absorbed. Distillation yielded 2533.8 g (66.7%) of perfluoro[2-(2-fluorosulfonylethoxy)-propyl-1,2-dichloroethyl ether], bp 165° C.

To a quartz tube (1-inch outside diameter and 1 foot long) heated to 550° C. were added nitrogen dioxide at a rate of approximately 0.2 g/min and 37.6 g perfluoro[2-(2-fluorosulfonylethoxy)-propyl-1,2-dichloroethyl ether] at a rate of 0.33 ml/min. The product was trapped in a dry ice cooled trap, allowed to come to room temperature, treated with 20 ml methanol, and washed with 250 ml water to give 19.3 g of product. The combined distillation of a number of similar runs yielded methyl perfluoro-7,8-dichloro-4-methyl-3,6-dioxaoctanoate, bp 167° C., whose structure was confirmed by infrared and NMR spectroscopy.

A mixture of 10 g crude methyl perfluoro-7,8-dichloro-4-methyl-3,6-dioxaoctanoate, 5 g zinc dust, 50 ml anhydrous diethylene glycol dimethyl ether and 0.1 g iodine was heated to 140° C., and then distilled. The distillate was washed with water and the product chromatographed to yield appreciable amounts of $CF_2=CFOCF_2CF(CF_3)OCF_2COOCH_3$. The structure of the final product was proven by IR spectroscopy and by conversion with bromine to $CF_2BrCFBrOCF_2CF(CF_3)OCF_2COOCH_3$. The structure of the vinyl ether was further confirmed by its boiling point, 75° C. at 50 mm of Hg, and its NMR spectrum.

EXAMPLE 10

A piece of 7-mil film of a copolymer of tetrafluoroethylene and perfluoro(3,6-dioxa-4-methyl-7-octenesulfonyl fluoride) having an equivalent weight 1200, and containing one surface layer of approximately 1-mil depth which had been converted to the corresponding sodium salt of the sulfonic acid, was heated with 15 psi (absolute) of 25% fluorine in nitrogen and 400 psi (absolute) of compressed air at 50° C. for 2 hours. The excess gases were removed, air added, and the film removed. The infrared spectrum of the whole film thickness showed the presence of sulfonyl fluoride groups and absorption at 5.6 microns due to carboxylic acid. The infrared spectrum of the starting film was almost identical, but lacked the 5.6 micron absorption.

EXAMPLE 11

A piece of 7-mil film of a copolymer of tetrafluoroethylene and perfluoro(3,6-dioxa-4-methyl-7-octenesulfonyl fluoride) having an equivalent weight of 1100, and containing one surface layer of approximately 1 mil depth which had been converted to the corresponding sodium salt of the sulfonic acid, was heated with 15 psi (gauge) of 25% fluorine in nitrogen and 1000 psi (gauge) of oxygen at 30° C. for 4 hours. The film was removed and treated at 90° C. with a mixture of dimethylsulfoxide, water and potassium hydroxide for 1 hour. After washing, the film was mounted in a chloralkali cell, and aqueous sodium chloride electrolyzed at a current density of 2.0 asi to give 33.0–38.6% NaOH at current efficiencies of 75.8–81.7% at a cell voltage of 3.9–4.2 volts.

EXAMPLE 12

Conversion of $CClF_2CClFOCF_2CF(CF_3)OCF_2CF_2SO_2F$ to $CClF_2CClFOCF_2CF(CF_3)OCF_2COOCH_3$ A mixture of 150 ml water, 50 ml 1,2-dimethoxyethane, 76 g sodium sulfite and 103.4 g $CClF_2CClFOCF_2CF(CF_3)OCF_2CF_2SO_2F$ was heated in a nitrogen atmosphere for 16 hours at 85°–87° C. The mixture was cooled to 50° C., 600 ml of isopropanol added, heated to 70° C. and filtered. The solids were washed twice with hot isopropanol, and all the filtrates were combined and evaporated to dryness.

The resulting solid was dissolved in 600 ml water, and the solution was cooled and acidified with 50 ml concentrated sulfuric acid while keeping the temperature below 10° C. Two grams of ferrous ammonium sulfate was added and air was bubbled through the solution at room temperature for 48 hours. The reaction mixture which contained two liquid layers and a solid was extracted three times with ether, and the ether extracts were combined and distilled to give 53.8 g of a colorless liquid, b.p. 92°–110° C. at 11 mm Hg.

The 53.8 g of liquid was added to 70 ml anyhdrous methanol and 1 ml concentration sulfuric acid and refluxed for 22 hours; the mixture was added to 300 ml water, and a lower layer separated. The lower layer was washed with water and dried with calcium chloride to give 35.6 g (40.2% yield based on starting $CClF_2CClFOCF_2CF(CF_3)OCF_2CF_2SO_2F$) of $CClF_2CClFOCF_2CF(CF_3)OCF_2COOCH_3$ whose infrared spectrum and gas chromatographic retention time were identical to authentic material.

EXAMPLE 13

Copolymerization of tetrafluoroethylene and $CF_2=CFOCF_2CF(CF_3)OCF_2COOCH_3$

A 330-ml stainless steel pressure tube was charged with 35 g $CF_2=CFOCF_2CF(CF_3)OCF_2COOCH_3$, 20 g tetrafluoroethylene and 15 ml of a solution containing 0.05% perfluoropropionyl peroxide in 1,1,2-trichloro-1,2,2-trifluoroethane. After heating for 3 hours at 50° C., the unreacted gases were vented and liquid and solid product evaporated to dryness. The solid polymeric product was dried thoroughly in a vacuum oven at 100° C., to give 3.5 g of white solid. The product was pressed into a clear film at 200° C., reacted with a mixture of KOH, dimethyl sulfoxide and $H_2O$, and dried to give a copolymer of tetrafluoroethylene and $CF_2=CFOCF_2CF(CF_3)OCF_2COO-K+$. Infrared spectra showed the presence of appreciable carboxylate salt, and the film had a resistivity of 39.5 ohm-cm.

EXAMPLE 14

A mixture of 32.8 g $CF_2=CFOCF_2CF(CF_3)OCF_2COOCH_3$, 31 g 1,1,2-trichloro-1,2,2-trifluoroethane, 15 ml of a 0.5% solution of perfluoropropionyl peroxide in 1,1,2-trichloro-1,2,2-trifluoroethane and 200 psi tetrafluoroethylene was heated for 3 hours at 50° C. while adding tetrafluoroethylene to maintain the pressure at 200 psi. The excess gases were vented and the residue heated to remove the unreacted monomers and solvent. The solid residue was washed three times with aqueous acetone, filtered, and dried in a vacuum oven at 100° C. to give 4.5 g of a white solid. A film of the material was pressed at 290° C., and infrared spectrum of the film showed strong absorption at 3.35 and 5.60 microns characteristic of an ester of a fluorinated carboxylic acid. The ester groups were converted to the corresponding carboxylate salt by reaction with dimethyl sulfoxide, potassium hydroxide and water at 90° for 1 hour. Titration of the film showed an equivalent weight of 1550.

EXAMPLE 15

A mixture of 41 g $CF_2=CFOCF_2CF(CF_3)OCF_2COOCH_3$, 15.9 g 1,1,2-trichloro-1,2,2-trifluoroethane, 20 g tetrafluoroethylene and 15 ml of a 0.05% solution of perfluoropropionyl peroxide in 1,1,2-trichloro-1,2,2,-trifluoroethane was heated for 3 hours at 50° C. The unreacted monomer and solvent were removed from the polymeric product, and the polymer was washed with aqueous acetone and dried in a vacuum oven at 100° C. The product, 4.2 g, was pressed into a film at 190° C. and the ester hydrolyzed to the carboxylate salt in a mixture of dimethyl sulfoxide, water and potassium hydroxide at 90° C. for 45 minutes. The polymer had an equivalent weight of 818.

A 5–6 mil thick film of this polymer was placed in a chloralkali cell, and aqueous sodium chloride was electrolyzed at 2 asi to give 36% NaOH at a current efficiency of 94% and a cell voltage of 3.71 volts. After 118 days of continuous testing the cell continued to produce 37% HaOH at a current efficiency of 90% and a cell voltage of 3.78 volts.

Although the invention has been described by way of specific embodiments, it is not intended to be limited thereto. As will be apparent to those skilled in the art, numerous embodiments can be made without departing from the spirit of the invention or the scope of the following claims.

We claim:

1. A process which comprises contacting a first fluorinated polymer which contains pendant side chains containing

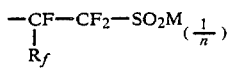

groups, wherein $R_f$ is F, Cl or a $C_1$ to $C_{10}$ perfluoroalkyl radical, M is H, an alkali metal or an alkaline earth metal, ammonium, substituted ammonium including quaternary ammonium, or hydrazinium including substituted hydrazinium, and n is the valence of M, with suitable oxidizing agent capable of introducing into the infrared spectrum of the resulting polymer absorption bands at about 1785 $cm^{-1}$ or about 1680 $cm^{-1}$, and separating therefrom a second fluorinated polymer which contains pendant side chains containing

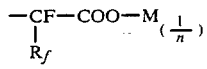

groups.

2. The process of claim 1 wherein the first fluorinated polymer is in the form of a film or membrane, and has an ion exchange capacity of 0.5 to 1.6 meq/g.

3. The process of claim 2 wherein the film or membrane is contacted with the oxidizing agent on at least one surface thereof and to a depth of at least 200 angstroms.

4. The process of claim 3 wherein the depth is less than half the thickness of the film or membrane.

5. The process of claim 2 wherein about 10% to about 90% of the

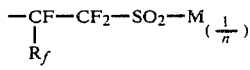

groups are converted to

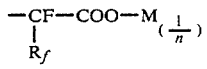

groups.

6. The process of claim 2 wherein at least about 90% of the

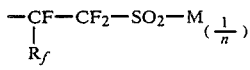

groups are converted to

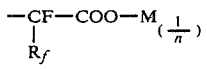

groups.

7. The process of claim 2 wherein up to about 95% of the

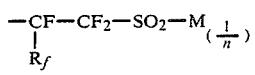

groups are converted to

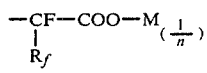

groups.

8. The process of claim 1 wherein the first fluorinated polymer which contains pendant side chains containing

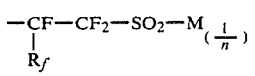

groups is the product of contacting a fluorinated polymer which contains pendant side chains containing

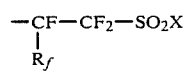

groups wherein X is F or Cl with a compound having the formula

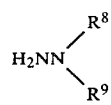

wherein $R^8$ is H or a $C_1$ to $C_8$ alkyl radical and $R^9$ is H or a $C_1$ to $C_8$ alkyl radical, and separating therefrom the first fluorinated polymer.

9. The process of claim 8 wherein the film or membrane is contacted with

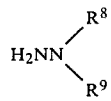

on at least one surface thereof and to a depth of at least 200 angstroms.

10. The process of claim 9 wherein $R^8$ is H and $R^9$ is H.

11. The process of claim 10 wherein the contacting with $H_2N-NH_2$ is carried out in the presence of an alkali metal hydroxide, an alkaline earth metal hydroxide, or a tertiary amine.

12. The process of claim 1 wherein the first fluorinated polymer contains pendant side chains containing

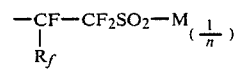

groups wherein M is H and n is 1, and the oxidizing agent is oxygen.

13. The process of claim 12 wherein contacting with oxygen is carried out in the presence of a catalytic amount of metal which can exist in more than one valence state.

14. The process of claim 13 wherein contacting with oxygen is carried out in the presence of a catalytic amount of a vanadium, iron, uranium, cobalt, nickel, copper or manganese salt.

15. The process of claim 1 wherein the oxidizing agent is a permanganate salt, chromic acid, a vanadate salt, nitrous acid or a hypochlorite salt.

16. A process which comprises contacting a fluorinated compound containing a

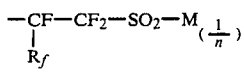

group wherein R is F, Cl or a $C_1$ to $C_{10}$ perfluoroalkyl radical, M is H, an alkali metal or an alkaline earth metal, and n is the valence of M, with a suitable oxidizing agent capable of introducing into the infrared spectrum of the resulting compound absorption bands at about 1785 $cm^{-1}$ or about 1680 $cm^{-1}$, and separating therefrom a second fluorinated compound containing a

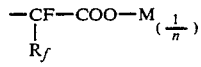

group.

17. The process of claim 16 wherein the first fluorinated compound contains a

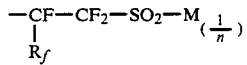

group wherein M is H and n is 1, and the oxidizing agent is oxygen.

18. The process of claim 17 wherein contacting with oxygen is carried out in the presence of a catalytic amount of a metal which can exist in more than one valence state.

19. The process of claim 16 wherein the oxidizing agent is a permanganate salt, chromic acid, nitrous acid or a hypochlorite salt.

20. A fluorinated polymer which contains pendant side chains containing

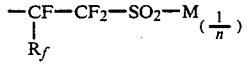

groups, wherein R is F, Cl or a $C_1$ to $C_{10}$ perfluoroalkyl radical, M is H, an alkali metal or an alkaline earth metal, ammonium, substituted ammonium including quaternary ammonium, or hydrazinium including substituted hydrazinium, and n is the valence of M.

21. The polymer of claim 20 in the form of a film or membrane.

22. The polymer of claim 20 which contains pendant side chains containing

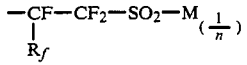

groups and pendant side chains containing

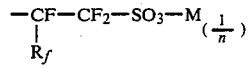

groups, wherein $R_f$, M and n are as defined in claim 20.

23. The polymer of claim 22 in the form of a film or membrane.

24. A polymer having the repeating units

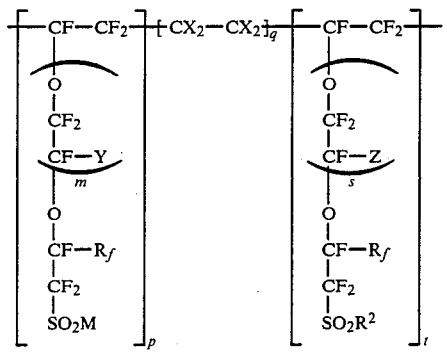

wherein
m is 0, 1 or 2,
p is 1 to 10,
q is 3 to 15,
s is 0, 1 or 2,
t is 0 to 10,
the X's taken together are four fluorines or three fluorines and one chlorine,
Y is F or $CF_3$,
Z is F or $CF_3$,
$R_f$ is F, Cl or a $C_1$ to $C_{10}$ perfluoroalkyl radical,
$R^2$ is F, Cl or

M is H, alkali metal, alkaline earth metal, ammonium, substituted ammonium including quaternary ammonium, hydrazinium including substituted hydrazinium, and
n is the valence of M.

25. The polymer of claim 24 wherein t is 0.

26. The polymer of claim 24 wherein p and t are each at least 1.

27. Process for making a fluorinated polymer which contains pendant side chains containing

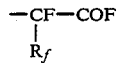

and/or

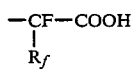

groups which comprises contacting a fluorinated polymer which contains pendant side chains containing

groups wherein $R^2$ is

M is H, alkali metal or alkaline earth metal, and n is the valence of M, with a mixture of fluorine and oxygen.

28. Process for making a fluorinated ion exchange polymer which contains pendant side chains containing

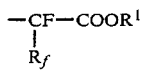

groups wherein $R^1$ is

where M is H, alkali metal and n is the valence of M, which comprises the process of claim 27 followed by subjecting the polymeric product therefrom to hydrolysis.

29. Process for making a polymer having the repeating units

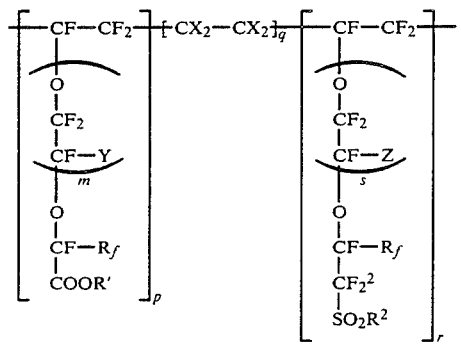

wherein
 m is 0, 1 or 2,
 p is 1 to 10,
 q is 3 to 15,
 r is 1 to 10,
 s is 0, 1, 2 or 3
 the X's taken together are four fluorines or three fluorines and one chlorine,
 Y is F or $CF_3$,
 Z is F or $CF_3$,
 $R_f$ is F, Cl or a $C_1$ to $C_{10}$ perfluoroalkyl radical,
 $R^1$ is

$R^2$ is

M is H, alkali metal or alkaline earth metal and n is the valence of M, which comprises the steps of contacting a fluorinated polymer having the repeating units

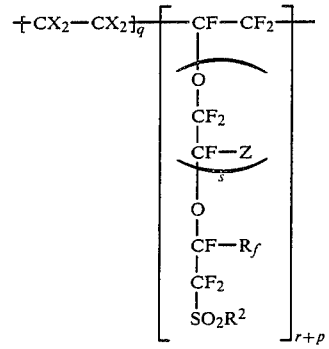

wherein $R^2$ is

where M is H, alkali or alkaline earth metal and n is the valence of M, with a mixture of fluorine and oxygen, followed by subjecting the polymeric product therefrom to hydrolysis.

30. An electrolytic cell comprising a housing with separate anode and cathode sections, said sections separated by a film or membrane of a fluorinated ion exchange polymer having the repeating units

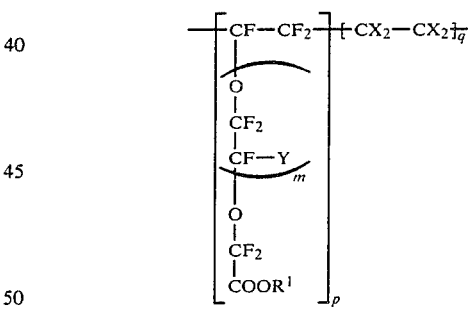

wherein
 m is 0, 1, or 2,
 p is 1 to 10,
 q is 3 to 15,
 the X's taken together are four fluorines or three fluorines and one chlorine,
 Y is F or $CF_3$, and
 $R^1$ is an alkali metal,
said polymer having an equivalent weight no greater than about 1500 and no less than about 625.

31. An electrolytic cell of claim 30 comprising a housing with separate anode and cathode sections, wherein the polymer of the film or membrane separating the sections has an equivalent weight no greater than about 1250 and no less than about 833.

32. An electrolytic cell comprising a housing with separate anode and cathode sections, said sections separated by a laminar structure having a base layer of a fluorinated ion exchange polymer, and having on at least one surface thereof a layer of a polymer having the repeating units

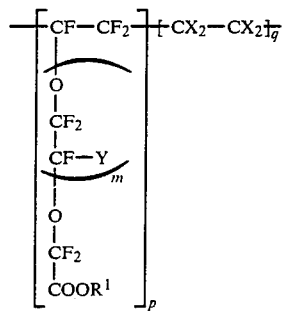

wherein m is 0, 1, or 2, p is 1 to 10, q is 3 to 15, the X's taken together are four flourines or three fluorines and one chlorine, Y is F or $CF_3$, and $R^1$ is an alkali metal, said polymer having an equivalent weight no greater than about 1500 and no less than about 625.

33. In a process of production of halogen and metal hydroxide of an alkali metal, by electrolysis of a halide of said metal employing separate anode and cathode sections in an electrolytic cell, the improvement comprising passing ions of said metal through a film or membrane of a fluorinated ion exchange polymer having the repeating units

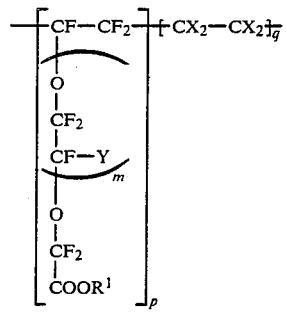

wherein
m is 0, 1, or 2,
p is 1 to 10,
q is 3 to 15,
the X's taken together are four fluorines or three fluorines and one chlorine,
Y is F or $CF_3$, and
$R^1$ is an alkali metal,
said polymer having an equivalent weight no greater than about 1500 and no less than about 625.

34. In a process of production of halogen and metal hydroxide of an alkali metal, by electrolysis of a halide of said metal employing separate anode and cathode sections in an electrolytic cell, the improvement comprising passing ions of said metal through a laminar structure having a base layer of a fluorinated ion exchange polymer, and having on at least one surface thereof a layer of a polymer having the repeating units

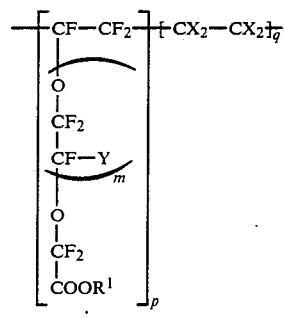

wherein
m is 0, 1, or 2,
p is 1 to 10,
q is 3 to 15,
the X's taken together are four fluorines or three fluorines and one chlorine,
Y is F or $CF_3$, and
$R^1$ is an alkali metal,
said polymer having an equivalent weight no greater than about 1500 and no less than about 625, the base layer of which has sulfonyl groups at least a majority of which are present as ion exchange sites in ionic form and the modified surface layer facing the cathode portion of the cell.

* * * * *